United States Patent
Alsaleh et al.

(10) Patent No.: US 10,069,856 B2
(45) Date of Patent: Sep. 4, 2018

(54) SYSTEM AND METHOD OF COMPARATIVE EVALUATION FOR PHISHING MITIGATION

(71) Applicant: King Abdulaziz City for Science and Technology, Riyadh (SA)

(72) Inventors: Mansour Abdulrahman Alsaleh, Riyadh (SA); Abdulrahman Saad Alarifi, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 183 days.

(21) Appl. No.: 15/153,981

(22) Filed: May 13, 2016

(65) Prior Publication Data
US 2017/0331848 A1 Nov. 16, 2017

(51) Int. Cl.
*H04L 29/06* (2006.01)

(52) U.S. Cl.
CPC ...... *H04L 63/1433* (2013.01); *H04L 63/1483* (2013.01)

(58) Field of Classification Search
CPC .................. H04L 63/1483; H04L 63/1433
See application file for complete search history.

(56) References Cited

U.S. PATENT DOCUMENTS

| | | |
|---|---|---|
| 8,041,769 B2 | 10/2011 | Shraim et al. |
| 8,566,938 B1 | 10/2013 | Prakash et al. |
| 8,635,703 B1 * | 1/2014 | Belani ............... H04L 63/1433 726/22 |
| 8,839,418 B2 | 9/2014 | Hulten et al. |
| 9,160,766 B2 | 10/2015 | Kashyap et al. |
| 2012/0311703 A1 | 12/2012 | Yanovsky et al. |
| 2014/0380453 A1 | 12/2014 | Alonso Cebrian et al. |

OTHER PUBLICATIONS

Zetter,"Sony Got Hacked Hard: What We Know and Don't Know So Far", Wired, www.wired.com/2014/12/ sony-hack-what-we-know, Dec. 3, 2014, 17 pages.
Kirk, "Report: Inside North Korea's network, NSA saw signs of Sony attack", IDG News Service, Jan. 18, 2015, 3 pages.
Mahdi, "Saudi Arabia Says Aramco Cyberattack Came From Foreign States", Bloomberg, http://www.bloomberg.com/news/articles/20121209/saudiarabiasaysaramcocyberattackcamefromforeignstates, Dec. 9, 2012, 4 pages.

(Continued)

*Primary Examiner* — Tri M Tran
(74) *Attorney, Agent, or Firm* — Andrew M. Calderon; Roberts Mlotkowski Safran Cole & Calderon, P.C.

(57) ABSTRACT

The present disclosure generally relates to information security and, more particularly, to systems and methods of comparative evaluation for phishing mitigation. Evaluating the anti-phishing approaches includes: initiating, on a computing device, a phishing attack; initiating, on the computing device, an anti-phishing approach against the phishing attack; and evaluating, using the computing device, different criteria of the anti-phishing approach to determine an overall effectiveness of the anti-phishing approach by applying a comparative framework of evaluation metrics to the different criteria of the anti-phishing approach.

20 Claims, 3 Drawing Sheets

(56) References Cited

OTHER PUBLICATIONS

Khonji et al., "Phishing Detection: A Literature Survey", Communications Surveys & Tutorials, IEEE, 15(4), 2013, pp. 2091-2121, 31 pages.
Sheng et al., "Who Falls for Phish? A Demographic Analysis of Phishing Susceptibility and Effectiveness of Interventions", Carnegie Mellon University, Indraprastha Institute of Information Technology, ACM, 2010, pp. 373-382, 10 pages.
Bonneau et al., "The Quest to Replace Passwords: A Framework for Comparative Evaluation of Web Authentication Schemes", In Security and Privacy (SP), 2012 IEEE Symposium, IEEE, 2012, pp. 553-567, 15 pages.
Alsaleh et al., "Why Phishing becomes a Precursor to Brutal Cyber Attacks? Comparative Evaluation Framework of Mitigation Approaches", 45th Annual IEEE/IFIP International Conference on Dependable Systems and Networks, Rio de Janeiro, Brazil, Jun. 22-25, 2015, 3 pages.
TrendLabsSM Apt Research Team, "Spear-Phishing Email: Most Favored APT Attack Bait" Technical report, 2012, Accessed Jan. 2015, 8 pages.

* cited by examiner

| Evaluation Metrics ||||
|---|---|---|---|
| | No. | Name | Description |
| Security & Privacy | S1 | Comprehensive solution | Ability to detect the various types of phishing instead of one type only; e.g., detecting spoofing and deception in the received email messages, and detecting fake website whose look is similar to a legitimate one for the purpose of acquiring sensitive information |
| | S2 | Resilient to source spoofing | Ability to verify (when possible) that the received data is originated from the claimed source |
| | S3 | Resilient to phishing content | Ability to detect any content that is sent for the purpose of phishing (e.g., ability to understand language semantics and visual similarities) |
| | S4 | Minimize false alarms | Maintain a practical rate of legitimate instances that are incorrectly flagged as phishing attacks in relation to all existing legitimate instances |
| | S5 | Multi-layer defense approach | The solution goes beyond detection and prevention to include offensive capabilities that attack phishing campaigns to render them ineffective and correction capabilities that aim to take down such campaigns [3] |
| | S6 | Machine-centric approach vs. human-centric | Ability to identify phishing attacks with minimal dependency on user judgment |
| | S7 | Context-based correlation of events | Ability to monitor and correlate multiple variables and events from multiple sources to identify phishing attacks |
| | S8 | Detect phishing campaigns | Ability to detect phishing campaigns as such information might be helpful in protecting other users and in stopping those campaigns by other means |
| | S9 | Integrability | Tool can be integrated with other anti-phishing solutions to combine security features of both |
| | S10 | Frequent updates | Tool support frequent updates as long response time from software vendors to update their tools gives phishers sufficient time window to utilize new attacks |
| Usability | U1 | Cognitively-effortless | Less burden on users so that they do not need to identify suspicious events (e.g., changes in the URL or the look of the webpage) |
| | U2 | Physically-effortless | Tool does not require any physical effort other than what is usually required without the solution |
| | U3 | Users scalability | The solution must not burden the user with extra effort as a result of scaling the solution up to cover more websites |
| | U4 | Prompt-response | Tool response must be quick to enhance users' experience |
| | U5 | Minimize number of interrupts | Tool should have low rate of interruptions (e.g., errors and warnings) |
| | U6 | Easy to learn | Users can learn easily how to use the solution effectively |
| | U7 | Easy to Install | Tool installation process should be easy to naive users and does not require advanced knowledge in the information security |
| | U8 | Use educational messages rather than warnings | Messages should be in the form of educational content rather than warnings whenever possible and the tool must provide user awareness materials upon request |
| | U9 | Noticeable messages and signs | Tool messages and signs (e.g., warnings) should be easily seen and noticed |
| Deployability | D1 | Accessibility | Disabled users should be able to use the solution easily |
| | D2 | Low-cost scalability | The increase in the cost of deploying the solution with the increase in the number of users must be reasonable |
| | D3 | Maturity | The solution should be mature enough in terms of functionality and testing in real-world environment settings |
| | D4 | Use authorization | The solution owner should be authorized to utilize the entire set of offered functionalities without unrealistic restrictions |
| | D5 | Fault tolerance | Ability to continue operating properly in the event of the failure of some of the tool components |
| | D6 | Negligible time between failures | Ability to maintain negligible time between tool failures |
| | D7 | Browser Compatibility | The ability to support all well-known browsers |
| | D8 | Avoid passive warnings | The ability to function properly without the dependency on passive warnings as many users ignore such messages |

FIG. 2

SYSTEM AND METHOD OF COMPARATIVE EVALUATION FOR PHISHING MITIGATION

FIELD OF THE INVENTION

The present disclosure generally relates to information security and, more particularly, to systems and methods of comparative evaluation for phishing mitigation.

BACKGROUND

Phishing attacks have become alarming, largely because large-scale cyber attacks can be enabled through any number of different and emerging phishing attacks. With a relatively dramatic increase in phishing prevalence, effectiveness and creativity in the deception and trickery of attacks, detection solutions continue to emerge. However, no single solution seems capable to mitigate all targeted vulnerabilities effectively.

According to a recent study (*Spear-Phishing Email: Most Favored APT Attack Bait*, Trend Micro Inc., Research Paper (2012)), about 91% of targeted cyber attacks start off with spear-phishing emails (i.e., a phishing email which includes personal information that appears to be from a trusted source to increase the probability of success) which makes spear-phishing a primary means by which advanced persistent attacks infiltrate target networks. For example, it is not uncommon for a spear-phishing attack to be a well crafted message, including clever and relevant social engineering tactics, sent to specific employees at a company. Convinced this is a legitimate email, employees click a link in the email which directs them to a malware/exploit-laden site or to download a malicious attachment.

Variety and creativity in new phishing attacks add a fundamental dimension to the problem. As an example, a new phishing attack can include taking over a background tab on a browser (such as a web email) and showing a fake login page that looks similar to the original one for the purpose of tricking the user into entering their login credentials. This type of phishing attack is a new deceiving attack that some anti-phishing tools are not designed to detect.

Additional issues can result from a response time from software vendors to update their tools in response to new attacks. This response time can give phishers, i.e., those that are associated with the phishing attacks, sufficient time to utilize such new attacks.

SUMMARY

In an aspect of the disclosure, a method for evaluating anti-phishing approaches, comprises: initiating, on a computing device, a phishing attack; initiating, on the computing device, an anti-phishing approach against the phishing attack; and evaluating, using the computing device, different criteria of the anti-phishing approach to determine an overall effectiveness of the anti-phishing approach by applying a comparative framework of evaluation metrics to the different criteria of the anti-phishing approach.

In an aspect of the disclosure, a system for evaluating anti-phishing approaches, comprises: a CPU, a computer readable memory and a computer readable storage media; first program instructions to store in a database an anti-phishing approach; second program instructions to simulate a phishing attack; third program instructions to analyze a response from the anti-phishing approach to the phishing attack; and fourth program instructions to evaluate the anti-phishing approach by a comparative framework analysis using preselected evaluation metrics stored in the database and compared to different categories associated with the anti-phishing approach, wherein the first, second, third, and fourth program instructions are stored on the computer readable storage media for execution by the CPU via the computer readable memory.

In an aspect of the disclosure, a computer program product comprising a computer readable storage medium having program instructions embodied therewith, and the program instructions are readable by a computing device to cause the computing device to: initiate a phishing attack within a computing network; apply a selected anti-phishing approach against the phishing attack within the computing network; and evaluate different criteria of the anti-phishing approach by applying a plurality of preselected evaluation metrics of different categories of a comparative framework to the selected anti-phishing approach.

BRIEF DESCRIPTION OF THE DRAWINGS

The present invention is described in the detailed description which follows, in reference to the noted plurality of drawings by way of non-limiting examples of exemplary embodiments of the present invention.

FIG. 2 shows a comparative evaluation framework of anti-phishing approaches in accordance with aspects of the present invention.

DETAILED DESCRIPTION

Figure 1:
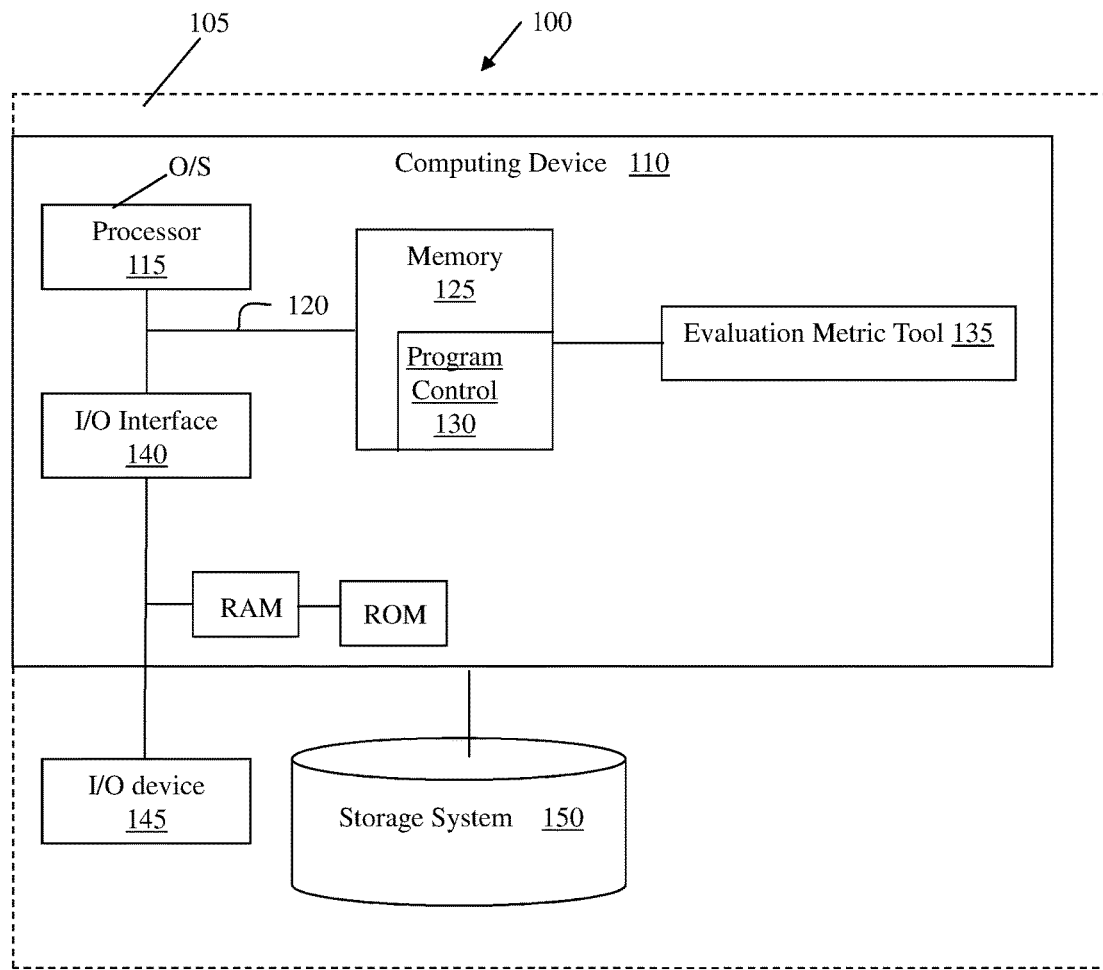
FIG. 1 shows an illustrative infrastructure for implementing the comparative evaluation framework of anti-phishing approaches in accordance with aspects of the invention.

The present disclosure generally relates to information security and, more particularly, to systems and methods of comparative evaluation for phishing mitigation. In embodiments, the comparative evaluation of anti-phishing approaches includes a comparative framework divided into various categories, which can be implemented in computing infrastructures to evaluate current mitigation processes, e.g., anti-phishing techniques/solutions. For example, the categories can be directed to security and privacy, usability, and deployability. Each of these categories can further include evaluation metrics for evaluating the performance of an anti-phishing tool (that is being tested against a simulated phishing attack).

In embodiments, each of the evaluation metrics can be extracted from identified features, strengths, and weaknesses of existing anti-phishing solutions. Additionally, a specific weighting or score can be applied to the evaluation metrics to obtain a comparative evaluation that specifically fits to a user's needs or to a specific type of phishing attack. It should be understood by those of ordinary skill in the art that an anti-phishing tool is typically a software product that can provide mitigation solutions to phishing attacks. These mitigation solutions can be different approaches, techniques, solutions and/or tools, whether they be implemented as software products or hardware products or a combination of both software and hardware products. Hereinafter, each of the different mitigation solutions will be referred generically as an anti-phishing tool or approach.

More specifically, the present disclosure is directed to a practical evaluation framework to better understand the effectiveness of current mitigation techniques (e.g., an anti-phishing tool or approach) of phishing attacks, by identifying the weaknesses and limitations in anti-phishing tools. By identifying and analyzing existing critical shortcomings of anti-phishing tools, a more robust set of guidelines can be formulated to assist the research community in developing more practical anti-phishing mitigation solutions that goes beyond obvious performance metrics. Further, the evaluation framework described herein offers a comprehensive holistic assessment that can identify the actual cause of success and failure of a particular anti-phishing mitigation approach. This evaluation framework will help not just in identifying strengths and weaknesses of existing anti-phishing solutions and comparing multiple anti-phishing technologies, but it will also assist in designing sound and effective anti-phishing solutions that practically addresses phishing problems, currently not addressed in known solutions. This evaluation framework arises out of a necessity to better understand why it is difficult to mitigate such phishing attacks by identifying the weaknesses and limitations in these anti-phishing tools.

In embodiments, the evaluation framework can be updated to reflect the findings of a comparative evaluation for anti-phishing mitigation approaches that have been evaluated. Specifically, the evaluation metrics of the evaluation framework can be updated based on user feedback and/or through industry trends, among other examples. Additionally, new evaluation metrics can be added to the evaluation framework, making the framework flexible and robust for future evaluation of updated and/or newer anti-phishing approaches. Further still, the evaluation framework can implement a weighting or scoring schema for measuring certain evaluation metrics in order to enable a comparison of anti-phishing mitigation approaches or certain specific evaluation metrics. In addition, the evaluation framework can be modified and tailored to be used for evaluating other similar cyber security systems.

Although the systems and methods described hereafter are with regard to exemplary methods, and/or computer program products, it should be understood that other implementations are also contemplated by the present disclosure as described herein. For example, other devices, systems, appliances, and/or computer program products according to embodiments of the present disclosure will be or become apparent to one of ordinary skill in the art upon review of the drawings and detailed description. It is intended that all such additional other devices, systems, appliances, processes, and/or computer program products be included within the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable storage medium(s) having computer readable program code embodied thereon.

The computer readable storage medium (or media) having computer readable program instructions thereon causes one or more computing processors to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. The computer readable storage medium is not to be construed as transitory signals per se; instead, the computer readable storage medium is a physical medium or device which stores the data. The computer readable program instructions may also be loaded onto a computer, for execution of the instructions, as shown in FIG. 1.

FIG. 1 shows a computer infrastructure 100 for implementing the steps in accordance with aspects of the disclosure. To this extent, the infrastructure 100 can implement the various categories and evaluation metrics shown in FIG. 2, e.g., categories 205, 210, and 215 and related evaluation metrics in order to evaluate the effectiveness of particular anti-phishing approaches/tools. The infrastructure 100 includes a server 105 or other computing system that can perform the processes described herein. In particular, the server 105 includes a computing device 110. The computing device 110 can be resident on a network infrastructure or computing device of a third party service provider (any of which is generally represented in FIG. 1).

The computing device 110 includes a processor 115 (e.g., CPU), memory 125, an I/O interface 140, and a bus 120. The memory 125 can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 110 is in communication with external I/O device/resource 145 and storage system 150. For example, I/O device 145 can comprise any device that enables an individual to interact with computing device 110 (e.g., user interface) or any device that enables computing device 110 to communicate with one or more other computing devices using any type of communications link. The external I/O device/resource 145 may be for example, a handheld device, PDA, handset, keyboard etc.

In general, processor 115 executes computer program code (e.g., program control 130), which can be stored in memory 125 and/or storage system 150. Moreover, in accordance with aspects of the invention, program control 130 controls an evaluation metric tool 135, which performs the processes described herein. The evaluation metric tool 135 can be implemented as one or more program codes in program control 130 stored in memory 125 as separate or combined modules. Additionally, the evaluation metric tool 135 may be implemented as separate dedicated processors or a single or several processors to provide the function of this tool. While executing the computer program code, the processor 115 can read and/or write data to/from memory 125, storage system 150, and/or I/O interface 140. The program code executes the processes of the invention. The bus 120 provides a communications link between each of the components in computing device 110.

The evaluation metric tool 135 is utilized to perform a comparative evaluation of different anti-phishing approaches and/or tools, utilizing a comparative evaluation framework such as shown in FIG. 2. For example, the different categories and evaluation metrics shown in FIG. 2 can be used to evaluate an anti-phishing approach that is being tested in a computer network such as computer infrastructure 100 of FIG. 1. In an illustrative example, the evaluation metric tool 135 monitors and assesses the performance of the anti-phishing approach when applied against a phishing attack by applying the different metrics shown in FIG. 2. For example, a spear-phishing email can be loaded into the computer infrastructure 100 and run so that it performs its phishing operations. Once the phishing attack is active, an anti-phishing approach is applied against the active phishing attack. The evaluation metric tool 135 will then assess the performance of the anti-phishing approach as it responds to the phishing attack in the computer infrastructure 100. The evaluation metric tool 135 can also assess the performance of different anti-phishing approaches and/or specific criteria of each of the different approaches.

Specifically, the evaluation metric tool 135 will evaluate the anti-phishing approach (e.g., techniques implemented in computer software) using any combination of categories and evaluation metrics shown in FIG. 2. The evaluation metric tool 135 can use these results to compare different anti-phishing approaches or techniques against one another, in addition to determining which approach, singularly or in any comparison, provides a robust anti-phishing approach. In embodiments, the evaluation metric tool 135 can provide reports to software developers if any of the criteria, e.g., metrics of FIG. 2, are not met, or at least if a certain threshold is not met. In this way, the software developer can be provided with objective criteria in order to improve the anti-phishing approach, based on any desired combination of metrics shown in FIG. 2.

In embodiments, the evaluation metric tool 135 can also assign scores or values to the various evaluation metrics found in the categories of the comparative evaluation framework, which is also referred to as a comparative framework of evaluation metrics of FIG. 2. As an example, the evaluation metric tool 135 can provide a numeric score of "5" to an evaluation metric, such as comprehensive solution S1 of category 205. As the evaluation metric tool 135 continues to monitor and assess the performance of the anti-phishing approach, a total score can be tabulated for all of the values assigned to each evaluation metric of the various categories. These tabulated scores can then be provided to a software developer so that improvements can be made to the anti-phishing approach. The evaluation metric tool 135 may be configured to generate a generic graphical layout of a comparative evaluation framework for each test of an anti-phishing approach.

In embodiments, the evaluation metric tool 135 can thus provide evaluation, monitoring, assessing and/or scoring of anti-phishing approaches to provide a comprehensive holistic assessment through a comparative evaluation framework to identify the actual causes of failure for a particular anti-phishing mitigation approach. Specifically, as existing anti-phishing mitigation techniques fail, there is a need to better understand and identify their weaknesses and limitations. The comparative evaluation framework, as implemented by the evaluation metric tool 135, provides guidelines that can assist the research community (and software developers) in developing more practical solutions. That is, based on the results of testing different anti-phishing approaches, the evaluation metric tool 135 can provide the software industry with objective information which can be used to improve anti-phishing approaches, hence increasing user satisfaction and overall performance. It is noted that the comparative evaluation framework generated for each anti-phishing approach can be generated after a single test, or after several tests, depending on the user's needs.

It is noted that several aspects of the invention require the use of a computer network, computer system, and computing devices. For example, the testing of the anti-phishing approaches requires a computing environment in which the anti-phishing approach can be activated and executed. Additionally, the testing of the anti-phishing approach further requires an application against a phishing attack Likewise then, the phishing attack also requires a computing network and computing devices for activation and execution. Further, certain evaluation metrics as described herein require the use of a computing device. For example, an anti-phishing approach is tested by being implemented in a computing network and monitoring the presence of false alarms or other metrics during operation of a computing device in a computing network that is under a phishing attack. Accordingly, the systems and methods described herein address a problem specifically arising in computer networks, which is not addressed by implementation or in the context of a non-generic computer system; in other words, the systems and methods described herein improve the functioning of the computer itself by evaluating, monitoring and presenting evaluation metrics for anti-phishing approaches.

FIG. 2 shows a comparative evaluation framework 200 for anti-phishing approaches in accordance with the disclosure. As illustrated in FIG. 2, the comparative evaluation framework 200 is unique in that it allows for holistic real world evaluation of anti-phishing approaches using a comprehensive set of evaluation metrics. Specifically, the comparative evaluation framework 200 allows for evaluation of anti-phishing approaches in real world applications (e.g., within a computing environment such as shown in FIG. 1) by applying metrics of the comparative evaluation framework 200.

As is known, phishing attacks can leverage both social engineering, through convincing the target user to download malicious content or to browse fake or malicious sites, and also technical vulnerabilities. Therefore, effective defensive measures require addressing both issues. Further, relying totally on cyber threat education or user awareness programs to mitigate the social engineering aspect of the phishing attack problem may not be feasible and can be considered a major contributor to the high success rate of phishing attacks.

Also, by implementing the processes and systems herein, it is not only possible to enhance end-user ability to correctly identify phishing messages and to avoid their malicious content, the underlying detection software, i.e. the anti-phishing approach, can also be enhanced to better identify and isolate phishing messages/pages/attacks on behalf of the user. Moreover, an inability of anti-phishing tools to accurately identify visual similarities and also to interpret the semantics of natural languages in the messages/sites can increase false alarms, something which can now be evaluated and corrected by implementing the systems and processes described herein. While it is believed that detection accuracy represents the main barrier in adopting anti-phishing tools, other fundamental factors (e.g., usability) are also addressed by the comparative evaluation framework 200.

More specifically, as shown in FIG. 2, the comparative evaluation framework 200 takes into account several different categories in the evaluation of anti-phishing approaches.

These categories are security and privacy 205, usability 210, and deployability 215. It should be noted that the comparative evaluation framework 200 is not limited to these categories, and can have additional categories depending on the desires of the user. For example, or in addition, the comparative evaluation framework 200 can include different categories based on feedback or a user's needs.

In embodiments, few of the identified evaluation metrics in each category can be extracted from identified features, strengths, and weaknesses of mitigation approaches (i.e., anti-phishing tools), and/or through an initial review of existing anti-phishing tools. While some of these evaluation metrics might relate to each other, particularly across categories, overlap has been limited as much as possible. Also, it should be recognized that anti-phishing evaluations focus on security-related issues and properties only; however, the present comparative evaluation framework 200 includes usability and deployability issues, which can quickly become a potential roadblock to adoption of an anti-phishing tool. Accordingly, by considering usability and deployability, the comparative evaluation framework 200 ensures that an anti-phishing approach can be effectively adopted.

Still referring to FIG. 2, various evaluation metrics fall under the security and privacy category 205. For example, the evaluation metrics for the security and privacy category 205 include a comprehensive solution S1, resilient to source spoofing S2, resilient to phishing content S3, minimize false alarms S4, multi-layer defense approach S5, a machine-centric approach vs. human-centric approach S6, context-based correlation of events S7, detect phishing campaigns S8, an integrability S9, and frequent updates S10. It should be noted that this list is not comprehensive and can include additional evaluation metrics, depending on factors such as security feedback, previous evaluations of anti-phishing approaches, and the user's needs, among other examples.

As shown in FIG. 2, each evaluation metric includes a corresponding implementation, e.g., description of a specific ability or evaluation function. That is, each of the evaluation metrics can be implemented in the computing infrastructure using, e.g., evaluation metric tool 135 of FIG. 1, in order to evaluate, monitor and/or provide feedback, concerning certain aspects, e.g., metrics, of the anti-phishing approach under test. It should be noted that these descriptions can be changed or varied, depending on industry trends, feedback, previous evaluations, and/or user's needs. For example:

(i) The comprehensive solution metric S1 evaluates the ability to detect various types of phishing instead of one type only, e.g., detecting spoofing and deception in the received email messages, and detecting fake website whose look is similar to a legitimate one for the purpose of acquiring sensitive information. Therefore, the S1 metric addresses the comprehensibility of an anti-phishing solution to the phishing attack.

(ii) The resilient to source spoofing metric S2 evaluates the ability to verify (when possible) that the received data originated from the claimed source. Therefore, the S2 metric addresses the resiliency to source spoofing.

(iii) The resilient to phishing content metric S3 evaluates the ability to detect any content that is sent for the purpose of phishing (e.g., ability to understand language semantics and visual similarities). Therefore, the S3 metric addresses the resiliency to phishing content.

(iv) The minimize false alarms metric S4 evaluates the ability to maintain a practical rate of legitimate instances that are incorrectly flagged as phishing attacks in relation to all existing legitimate instances. Therefore, the S4 metric addresses the minimizing of false alarms.

(v) The multi-layer defense approach metric S5 evaluates the ability to provide a solution (e.g., anti-phishing approach) that goes beyond detection and prevention to include offensive capabilities that attack phishing campaigns to render them ineffective and correction capabilities that aim to take down such campaigns. Therefore, the S5 metric addresses multi-layer defense approaches.

(vi) The machine-centric approach vs. human-centric metric approach S6 evaluates the ability to identify phishing attacks with minimal dependency on user judgment.

(vii) The context-based correlation of events metric S7 evaluates the ability to monitor and correlate multiple variables and events from multiple sources to identify phishing attacks.

(viii) The detect phishing campaigns metric S8 evaluates the ability to detect phishing campaigns as such information might be helpful in protecting other users and in stopping those campaigns by other means. Therefore, the S8 metric addresses detection of phishing campaigns.

(ix) The integrability metric S9 provides a tool that can be integrated with other anti-phishing approaches to combine the security features of both.

(x) The frequent updates metric S10 provides the ability to determine whether the anti-phishing tool (e.g., approach) supports relatively frequent updates, since a long response time from software vendors in updating their anti-phishing tools provides phishers a sufficient time window to utilize new and existing phishing attacks. Therefore, the S10 metric addresses the frequency of updates.

Continuing with FIG. 2, the usability category 210 also has several various evaluation metrics that assist in evaluating an anti-phishing approach. Specifically, the evaluation metrics for the usability category 210 include cognitively-effortless U1, physically-effortless U2, user's scalability U3, prompt-response U4, minimize number of interrupts U5, easy to learn U6, easy to install U7, a use of educational messages rather than warnings U8, and a noticeable messages and signs U9. Again, it should be noted that this list is not comprehensive and can include additional evaluation metrics, depending on factors such as feedback, previous evaluations of anti-phishing approaches, and the user's needs, among other examples.

It should be noted that the descriptions of any of the different metrics can be changed or varied, depending on industry trends, feedback, previous evaluations, or user's needs. In any scenario, and by way of more specific examples:

(i) The cognitively-effortless metric U1 evaluates whether there is a relatively less burden on users so that they do not need to identify suspicious events (e.g., changes in the URL or the look of the webpage).

(ii) The physically-effortless metric U2 determines whether any additional physical effort is required, other than what is usually required without the solution.

(iii) The user's scalability metric U3 evaluates whether a solution (anti-phishing approach) does not burden the user with extra effort as a result of scaling the solution up to cover more websites.

(iv) The prompt-response metric U4 determines whether a tool (anti-phishing approach) response is relatively quick to enhance user's experience.

(v) The minimize number of interrupts metric U5 evaluates whether a tool (anti-phishing approach) has a relatively low rate of interruptions (e.g., errors and warnings). Therefore, the U5 metric addresses minimizing of number of interrupts.

(vi) The easy to learn metric U6 evaluates whether users can learn relatively easily how to use the anti-phishing solution effectively. Therefore, the U6 metric addresses the easy to learn capabilities of the anti-phishing approach.

(vii) The easy to install metric U7 evaluates a tool installation process, e.g., whether the tool is relatively easy to install based on user level, e.g., naive users, and whether installation requires advanced knowledge in the information security field. Therefore, the U7 metric addresses the easy to install capabilities of the anti-phishing approach.

(viii) The use of educational messages rather than warnings metric U8 evaluates whether messages are or should be in the form of educational content rather than warnings whenever possible, and further whether the tool provides user awareness materials upon request.

(ix) The noticeable messages and signs metric U9 relates to evaluation of tool messages and signs (e.g., warnings) and whether they be relatively easily seen and noticed.

Still referring to FIG. 2, the deployability category 215 has several various evaluation metrics that assist in evaluating an anti-phishing approach. The evaluation metrics for the deployability category 215 includes several metrics including, e.g., accessibility D1, low-cost scalability D2, maturity D3, use authorization D4, fault tolerance D5, negligible time between failures D6, browser compatibility D7, and avoid passive warnings D8. Again, it should be noted that this list is not comprehensive and can include additional evaluation metrics, depending on factors such as feedback, previous evaluations of anti-phishing approaches, and the user's needs, among other examples.

It should be noted that the descriptions of any of the different metrics can be changed or varied, depending on industry trends, feedback, previous evaluations, or user's needs. In any scenario, and by way of more specific examples:

(i) The accessibility metric D1 evaluates whether disabled users are able to use the anti-phishing solution easily.

(ii) The low-cost scalability metric D2 evaluates whether there is an increase in the cost of deploying the solution (anti-phishing technique) with an increase in the number of users should be reasonable.

(iii) The maturity metric D3 evaluates whether a solution (anti-phishing technique) is mature enough in terms of functionality and testing in real-world environment settings.

(iv) The use authorization metric D4 evaluates whether a solution owner is authorized to utilize the entire set of offered functionalities without unrealistic restrictions.

(v) The fault tolerance metric D5 evaluates whether there is an ability to continue operating properly in the event of a failure of some or all of the tool components (e.g., components of the anti-phishing technique).

(vi) The negligible time metric between failures metric D6 evaluates whether there is an ability to maintain negligible time between tool failures.

(vii) The browser compatibility metric D7 evaluates whether there is support for all well-known browsers with particular anti-phishing technique.

(viii) The avoid passive warnings metric D8 evaluates whether the anti-phishing technique can function properly without the dependency on passive warnings (as many users ignore such messages).

Again, it should be noted that this list is not comprehensive and can include additional evaluation metrics, depending on factors such as feedback, previous evaluations of anti-phishing approaches, and the user's needs, among other examples. The identified evaluation metrics in each category can be extracted from identified features, strengths, and weaknesses of mitigation approaches (e.g., anti-phishing technique), and/or through an initial review of existing anti-phishing solutions. It should be noted that one having ordinary skill in the art would understand that these evaluation metrics can be extracted through a computer program product that initiates a phishing attack within a computing network; applies a selected anti-phishing approach against the phishing attack within the computing network; and evaluates different criteria of the anti-phishing approach by applying a plurality of these evaluation metrics in all three categories of the proposed comparative evaluation framework. More specifically, the evaluation metrics can be generated from previous evaluations of the anti-phishing technique. While some of these evaluation metrics might relate to each other, particularly across categories, overlap has been limited as much as possible.

Figure 3:
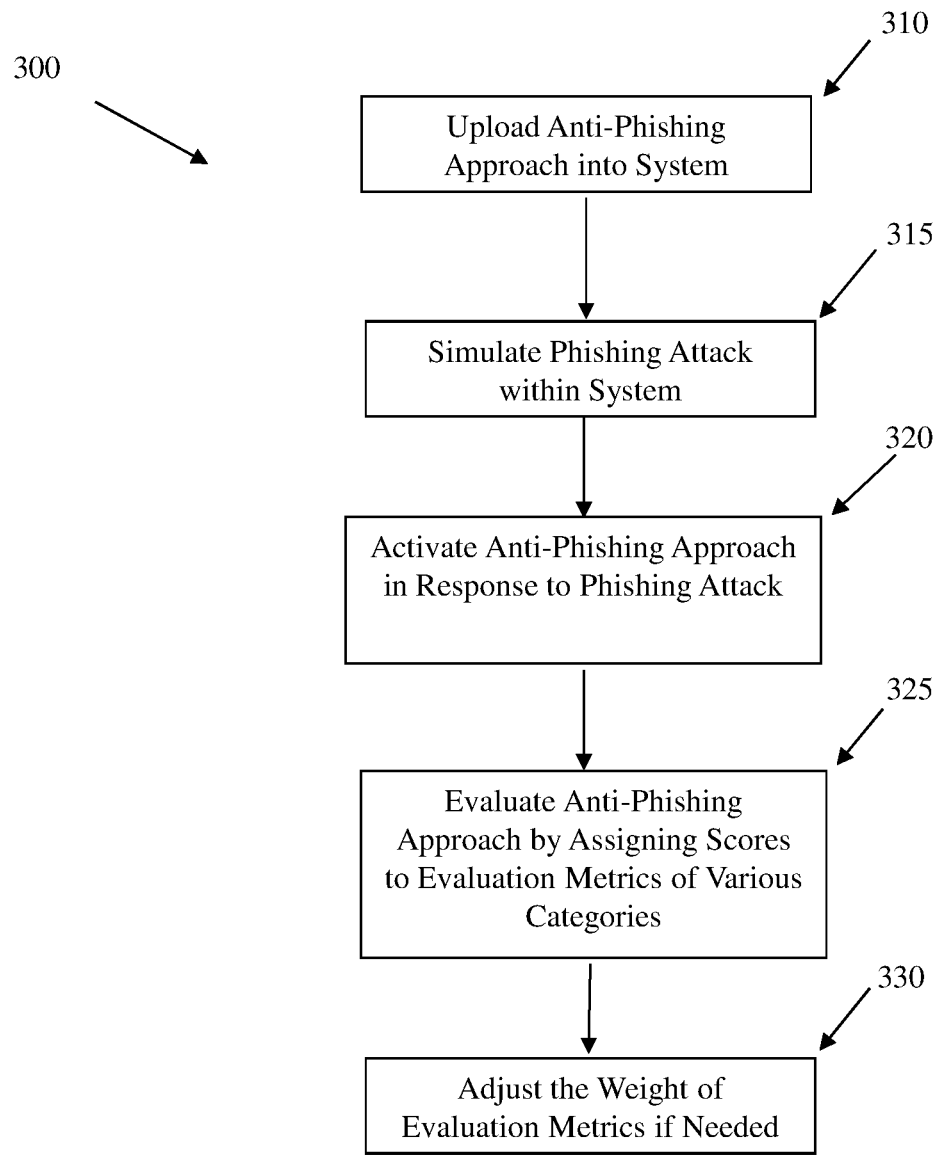
FIG. 3 shows an exemplary flow for implementing the comparative evaluation framework of anti-phishing approaches in accordance with aspects of the invention in accordance with aspects of the present invention.

FIG. 3 shows an exemplary flowchart for implementing the comparative evaluation framework of anti-phishing approaches in accordance with aspects of the invention in accordance with aspects of the present invention. As should be understood, aspects of the present disclosure are described herein with reference to flowchart illustrations which can be representative of diagrams of methods, apparatus (systems), and computer program products implemented in the computer infrastructure 100 shown in FIG. 1, for example. Accordingly, it will be understood that each block of the flowchart illustrations can be implemented by computer readable program instructions.

Referring to FIG. 3, a process 300 includes several steps for implementing a comparative evaluation framework, i.e., a comparative framework of evaluation metrics, of an anti-phishing approach. Beginning with step 305, an anti-phishing approach is uploaded into a computing network, e.g., computing infrastructure 100 of FIG. 1. The anti-phishing approach can be a currently software tool or a tool that is currently in development which provides certain security protocols against an anti-phishing attack. The anti-phishing approach can be stored by program instructions in a database, such as memory of 125 of FIG. 1, for access.

Once the anti-phishing approach is uploaded into the system at step 310, a user will select a phishing attack for activation. The phishing attack can be any disruptive technique, such as a spear-phishing email, among other examples. Further, a user can specifically select the difficulty level of detection of the phishing attack. For example, a user can select a phishing attack to be implemented that has a greater difficulty of detection. Accordingly, the user can control and/or modify the phishing attack.

At step 315, the selected phishing attack will be initiated and simulated in a computer infrastructure, such as computer infrastructure 100 of FIG. 1. With the phishing attack initiated and activated, at step 320, the anti-phishing approach will begin its security protocols to detect and/or prevent such simulated phishing attack. In this way, a user can initiate and apply a specific anti-phishing approach to a phishing attack in order to observe and evaluate the anti-phishing approach. This application of the anti-phishing approach can last for any duration of time that is suitable to fully evaluate the anti-phishing approach in accordance with the comparative evaluation framework shown in FIG. 2. It is further noted that initiation of both the phishing attack and anti-phishing approach can be automated, or can occur by initiation by a user, depending on a user's needs, the computing network, and the computing devices where the anti-phishing approach is tested and evaluated.

At step 325, the response of the anti-phishing approach will be evaluated using any combination of the selected categories and metrics of FIG. 2, as implemented by the evaluation metric tool 135 of FIG. 1. Depending on the user type, the evaluation metrics that are applied can be selected in any combination and/or weighted depending on the user preferences. For example, an administrator can select certain evaluation metrics to be applied in combination while deactivating other metrics so as to not be applied to the anti-phishing approach. This type of pre-selection of evaluation metrics allows a user further control over testing. The pre-selection of evaluation metrics and/or weights can occur at any point during the test process such as while the anti-phishing approach is applied to the phishing attack, for example. Pre-selection of the evaluation metrics still allows full operation of the evaluation metrics, such as scoring and weighting for the pre-selected evaluation metrics.

In embodiments, a user can assign a value and weight to each or any combination of evaluation metrics of the comparative evaluation framework 200. These values can be numeric, alphabetical, or any other symbol that represents a value. For example, the user can assign a score ranging from 1 to 10 to any combination of evaluation metrics. That is, the evaluation metric tool 135 can give a numeric value based on any criteria, e.g., the time it took for the anti-phishing approach to detect the phishing attack. It follows then that a shorter time period, such as less than 5 seconds, would provide the anti-phishing approach with a higher numeric score as opposed to a longer time period in detecting the phishing attack.

As each evaluation metric is given a value, a score can be tabulated which indicates the overall performance of the anti-phishing approach. This score can be tabulated by the evaluation metric tool 135 as it evaluates each selected category and metric. The score can be set as a threshold which can indicate a certain success level of the anti-phishing approach. For example, a certain score may overcome a threshold set for a satisfactory score; while in comparison, another score may fall below a threshold set for an indication of poor performance of the anti-phishing approach. Therefore, during the evaluation, an overall effectiveness of the anti-phishing approach can be determined by applying a comparative framework of evaluation metrics to the different criteria of the anti-phishing approach.

In embodiments, as the anti-phishing approach is tested, evaluation continues until either the phishing attack is subdued, the anti-phishing approach protocol is complete, or a user terminates the test. As mentioned, the evaluation metric scores can be tabulated for a total score, so that the anti-phishing approach can be awarded an overall score that represents the totality of all values given for each evaluation metric. In embodiments, the overall score can change by other tests being performed on the anti-phishing approach. For example, if three tests of the anti-phishing approach are run, an average score taking into account all three tests can be tabulated for the anti-phishing approach. Further, different anti-phishing approaches can be tested using the same evaluation metrics, or different evaluation metrics, from other anti-phishing approaches during the various tests. In this manner, the different anti-phishing approaches can be further compared to one another by ensuring that each anti-phishing approach was analyzed under the same evaluation metrics and the same operational environment as the other anti-phishing approaches.

Additionally, at step 330 the user can adjust the weighting of the metrics of the comparative evaluation framework. By adjusting a weighing of any evaluation metrics, for example, the evaluations metrics can be weighed individually or can be weighed as a specific group or can be weighed together as a category. Additional, the weighting can act as a lever to signify whether or when other steps should be performed or other operations should be executed. For example, upon reaching a certain score or a certain threshold, the lever will activate and the evaluation of the anti-phishing approach will move onto the next category or metric, perhaps even bypassing the group of evaluation metrics. It is noted that the process 300 can be implemented several times so that multiple comparative evaluations, i.e. tests, of the anti-phishing approach can occur. By assigning different weights to the evaluation metrics, a user can obtain a further comparative evaluation of the anti-phishing approach.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for evaluating anti-phishing approaches, comprising:
   extracting, using a computing device, evaluation metrics from an existing anti-phishing solutions;
   initiating, on the computing device, a phishing attack;
   initiating, on the computing device, an anti-phishing approach against the phishing attack;
   evaluating, using the computing device, different criteria of the anti-phishing approach to determine an overall effectiveness of the anti-phishing approach by applying a comparative framework of the evaluation metrics to the different criteria of the anti-phishing approach, wherein the comparative framework includes a plurality of categories, each of which include different evaluation metrics having values;
   tabulating, using the computing device, an overall score from the values of the evaluation metrics;
   providing, using the computing device, the overall score to develop a new anti-phishing approach, wherein the overall score comprises categories that exceed each category threshold based on preselected different evaluation metrics; and
   applying, using the computing device, the preselected different evaluation metrics for the new anti-phishing approach.

2. The method of claim 1, wherein the plurality of categories comprising a security and privacy category, a usability category, and a deployability category.

3. The method of claim 2, wherein each of the plurality of categories includes specific evaluation metrics which are used to evaluate different criteria of the anti-phishing approach.

4. The method of claim 2, wherein the security and privacy evaluation metrics include at least one evaluation comprising:
   comprehensibility of a solution to the phishing attack, resiliency to source spoofing, resiliency to phishing content, minimizing of false alarms, multi-layer defense approaches, machine-centric approach vs. human-centric approach, context-based correlation of events, detection of phishing campaigns, integrability, and frequency of updates.

5. The method of claim 2, wherein the usability category evaluation metrics include at least one evaluation of: cognitively-effortless, physically-effortless, user's scalability, prompt-response, minimizing of number of interrupts, easy to learn capabilities, easy to install capabilities, use of educational messages rather than warnings, and noticeable messages and signs.

6. The method of claim 2, wherein the deployability category evaluation metrics include at least one evaluation of: accessibility, low-cost scalability, maturity, use authorization, fault tolerance, negligible time between failures, browser compatibility, and passive warnings.

7. The method of claim 1, further comprising assigning different weights to the evaluation metrics to obtain a comparative evaluation between different evaluation metrics of the evaluation metrics and tabulating results of the different evaluation metrics of the evaluation metrics using the weights.

8. The method of claim 7, further comprising preselecting different evaluation metrics and applying the preselected different evaluation metrics while the anti-phishing approach is applied to the phishing attack.

9. The method of claim 8, wherein the tabulated result is compared to different anti-phishing approaches which were evaluating using same evaluation metrics.

10. A system for evaluating anti-phishing approaches, comprising:
   a CPU, a computer readable memory and a computer readable storage media;
   first program instructions to store in a database an anti-phishing approach;
   second program instructions to simulate a phishing attack;
   third program instructions to analyze a response from the anti-phishing approach to the phishing attack;
   fourth program instructions to generate evaluation metrics with assigned scores from evaluations of anti-phishing techniques;
   fifth program instructions to evaluate the anti-phishing approach by a comparative framework analysis using preselected evaluation metrics having scores and the generated evaluation metrics stored in the database and compared to different categories associated with the anti-phishing approach;
   sixth program instructions to tabulate an overall score from the scores of the generated evaluation metrics and the scores of the preselected evaluation metrics;
   seventh program instructions to provide the overall score to develop a new anti-phishing approach, wherein the overall score comprises categories that exceed each category threshold based on preselected different evaluation metrics; and
   eighth program instructions to apply the preselected different evaluation metrics for the new anti-phishing approach,
   wherein the first, second, third, fourth, fifth, sixth, seventh and eighth program instructions are stored on the computer readable storage media for execution by the CPU via the computer readable memory.

11. The system of claim 10, wherein the comparative framework includes different categories including security and privacy category, a usability category, and a deployability category, each of which includes different evaluation metrics.

12. The system of claim 11, wherein:
   the security and privacy evaluation metrics include at least one evaluation comprising: comprehensibility of a solution to the phishing attack, resiliency to source spoofing, resiliency to phishing content, minimizing of false alarms, multi-layer defense approaches, machine-centric approach vs. human-centric approach, context-based correlation of events, detection of phishing campaigns, integrability, and frequency of updates;
   the usability category evaluation metrics include at least one evaluation of: cognitively-effortless, physically-effortless, user's scalability, prompt-response, minimizing of number of interrupts, easy to learn capabilities, easy to install capabilities, use of educational messages rather than warnings, and noticeable messages and signs; and
   the deployability category evaluation metrics include at least one evaluation of: accessibility, low-cost scalability, maturity, use authorization, fault tolerance, negligible time between failures, browser compatibility, and passive warnings.

13. The system of claim 12, wherein the fourth program instructions further comprise assigning different weights to the evaluation metrics to obtain a comparative evaluation between different evaluation metrics.

14. A computer program product comprising a computer readable storage medium having program instructions embodied therewith, and the program instructions are readable by a computing device to cause the computing device to:
   extract evaluation metrics having assigned scores from identified features, strengths, and weaknesses from existing anti-phishing solutions to generate preselected evaluation metrics;
   initiate a phishing attack within a computing network;
   apply a selected anti-phishing approach against the phishing attack within the computing network;
   evaluate different criteria of the anti-phishing approach by applying a plurality of preselected evaluation metrics of different categories of a comparative framework to the selected anti-phishing approach;
   tabulate an overall score from assigned scores of the preselected evaluation metrics;
   provide the overall score to develop a new anti-phishing approach, wherein the overall score comprises categories that exceed each category threshold based on preselected different evaluation metrics; and
   apply the preselected different evaluation metrics for the new anti-phishing approach.

15. The computer program product of claim 14, further comprising comparing multiple anti-phishing approaches to one another by evaluating same criteria for each of the different anti-phishing approaches with same preselected evaluation metrics of the different categories of the comparative framework.

16. The computer program product of claim 14, further comprising providing a weighting to selected ones of the preselected evaluation metrics.

17. The computer program product of claim 16, wherein the scores for each of the applied plurality of preselected evaluation metrics of the different categories are compared against one another.

18. The computer program product of claim 16, wherein the scores for each of the applied plurality of preselected evaluation metrics of the different categories for each of the different anti-phishing approaches are compared against one another.

19. The computer program product of claim 16, wherein the different categories of the comparative framework include a security and privacy category, a usability category, and a deployability category.

20. The computer program product of claim 19, wherein each of the different categories include different evaluation metrics that are applied to the selected anti-phishing approach.

* * * * *